United States Patent
Cheng et al.

(10) Patent No.: US 8,208,061 B2
(45) Date of Patent: Jun. 26, 2012

(54) FLASH ASSIST SYSTEM, DIGITAL IMAGE CAPTURE DEVICE USING SAME AND FLASH ASSIST METHOD THEREOF

(75) Inventors: Chang-Wei Cheng, Tu-Cheng (TW); Wen-Ting Hsi, Tu-Cheng (TW)

(73) Assignees: Premier Image Technology (China) Ltd., Foshan, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 360 days.

(21) Appl. No.: 12/432,705

(22) Filed: Apr. 29, 2009

(65) Prior Publication Data

US 2010/0045854 A1    Feb. 25, 2010

(30) Foreign Application Priority Data

Aug. 21, 2008   (CN) .................. 2008 1 0304131 A

(51) Int. Cl.
*H04N 5/222* (2006.01)
*G03B 15/02* (2006.01)

(52) U.S. Cl. ........................................... 348/370

(58) Field of Classification Search .............. 348/370, 348/371, 333.02, 333.04; 396/60, 61
See application file for complete search history.

(56) References Cited

U.S. PATENT DOCUMENTS

| | | | | |
|---|---|---|---|---|
| 7,738,025 B2 * | 6/2010 | Nonaka | ..... | 348/333.13 |
| 2006/0165399 A1 * | 7/2006 | Feng et al. | ..... | 396/61 |
| 2007/0230933 A1 * | 10/2007 | Sugimoto et al. | ..... | 396/61 |
| 2008/0231742 A1 * | 9/2008 | Kurase | ..... | 348/371 |

FOREIGN PATENT DOCUMENTS

| | | | |
|---|---|---|---|
| JP | 05-165089 | * | 6/1993 |
| JP | 5165089 A | | 6/1993 |
| JP | 2004012494 A | | 1/2004 |

* cited by examiner

*Primary Examiner* — Nhan T Tran
(74) *Attorney, Agent, or Firm* — Altis Law Group, Inc.

(57) ABSTRACT

A flashing assist system is used in a digital image capture device that includes a camera module, a flash unit and a display. The camera module is capable of determining an object distance from the image capture device to an object. The flash unit is capable of providing varying flash intensity by determining a flash distance. The display is capable of displaying digital images and interactive information. The flash assist system includes a read unit, a determination unit and a generating unit. The read unit is configured for reading the object distance and the flash distance. The determination unit is configured for determining a target area of the flash unit using the object distance and the flash distance. The generating unit is configured for generating a preview of the object and the target area on the display.

8 Claims, 4 Drawing Sheets

FLASH ASSIST SYSTEM, DIGITAL IMAGE CAPTURE DEVICE USING SAME AND FLASH ASSIST METHOD THEREOF

BACKGROUND

1. Technical Field

The present disclosure relates to camera flash systems and, particularly, to a flash assist system, a digital image capture device using the flash assist system, and a flash assist method thereof.

2. Description of Related Art

A digital image capture device typically includes a flash unit capable of providing momentary illumination at the moment of capture to compensate for insufficient environmental illumination, and being operated manually to provide specific compensation for different ambient light conditions. However, it is difficult to set accurate flash intensity because of varying environmental requirements.

Therefore, it is desirable to provide a flash assist system, a digital image capture device using the flash assist system, and a flash assist method thereof which can overcome the limitations described.

DETAILED DESCRIPTION

Embodiments of the disclosure are now described in detail with reference to the drawings.

Figure 1:
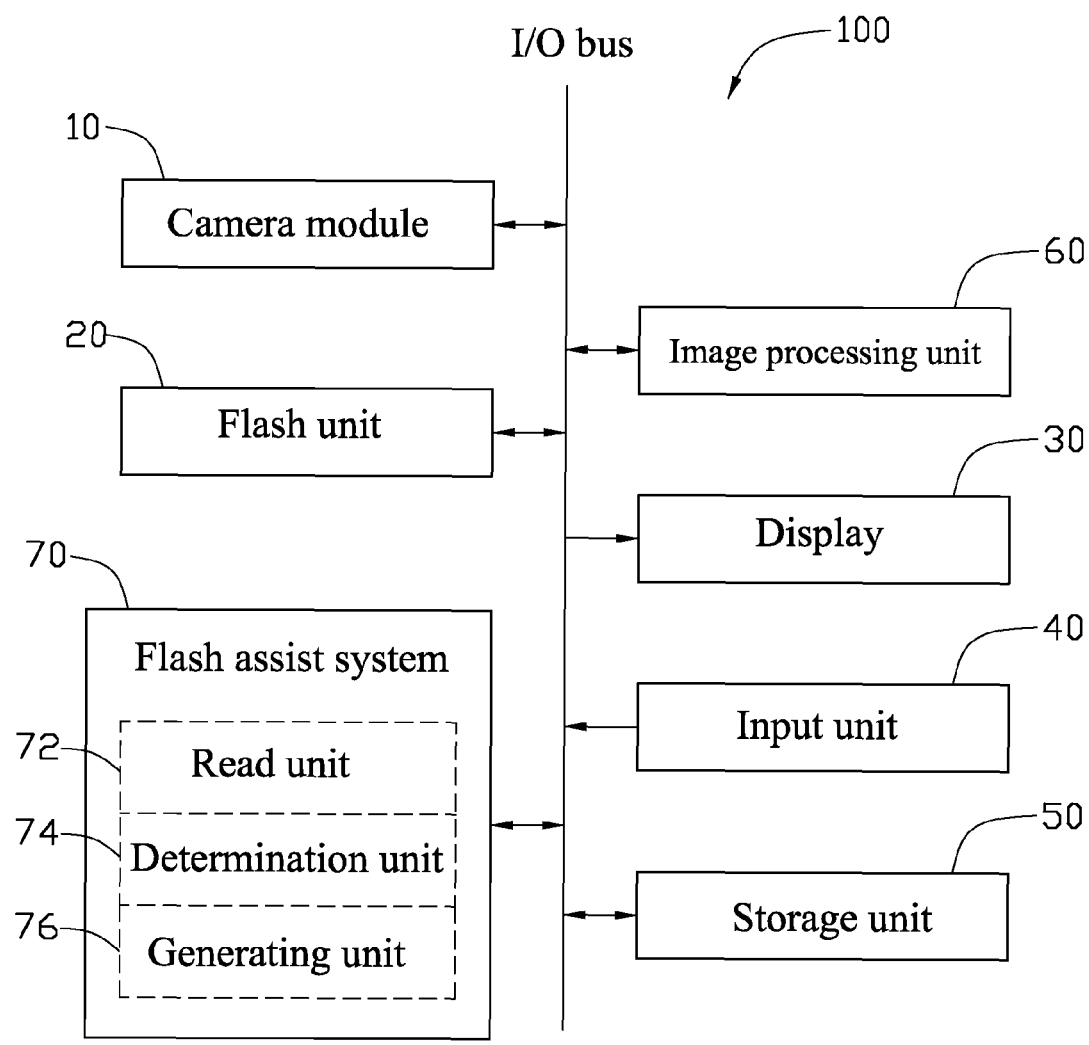
FIG. 1 is a block diagram of a digital image capture device, according to an exemplary embodiment.

Referring to FIG. 1, a digital image capture device 100 includes a camera module 10, a flash unit 20, a display 30, an input unit 40, a storage unit 50, an image processing unit 60, and a flash assist system 70. The digital image capture device 100 can be, but is not limited to, a digital still camera or a mobile phone equipped with a camera module and a flash unit.

The camera module 10 is configured for capturing an image by generating corresponding image signals. The camera module 10 automatically focuses on an object, and is capable of determining an object distance from the image capture device thereto. In detail, the camera module 10 is driven by a focus motor (not shown) step by step until a clear image is produced. Accordingly, the object distance can be calculated according to the number of steps that the focus motor takes to achieve the clear image using corresponding software modules executed in the digital image capture device 100. Alternatively, the camera module 10 can include a distance-measurement unit (not shown), which emits a light beam to the focused object, calculates the time before it receives the reflected light, and determine the object distance accordingly.

The flash unit 20 is configured for flash at the moment of image capture to compensate for insufficient environmental illumination. The flash unit 20 is capable of providing varying flash intensity by setting a flash distance via the input unit 40. The flash distance is a distance from the flash unit 20 to a position at which the flash is attenuated to provide a predetermined intensity.

The display 30, such as a liquid crystal display, is configured for displaying captured digital image(s) and interactive information. The input unit 40, such as a keypad, is configured for receiving user input. The display 30 and the input unit 40 constitute a user interface of the image capture device 100. Alternatively, the display 30 and the input unit 40 can be integrated into a touch-screen.

The storage unit 50 is configured for storing captured digital images.

The image processing unit 60 is configured for processing the captured image signals output by the camera module 10, and then outputting a corresponding digital image to the display 30 and/or the storage unit 50.

Figure 2:
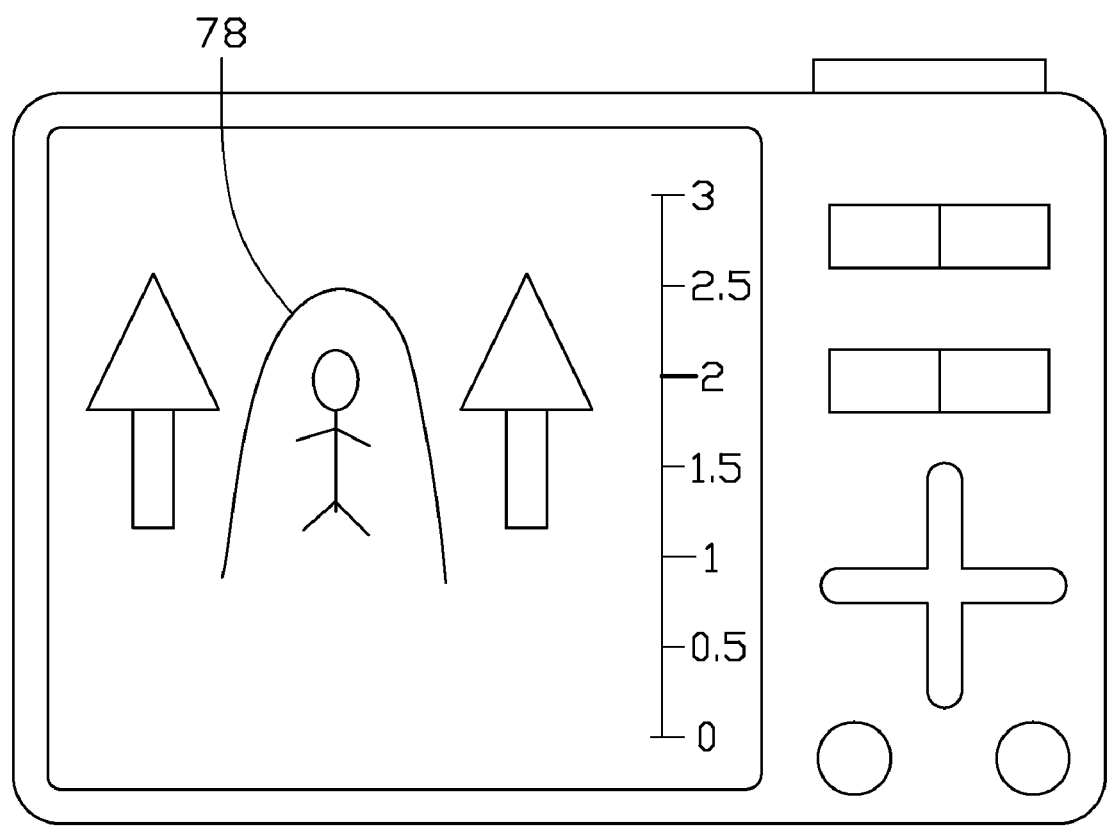
FIG. 2 is a schematic view of the back of the digital image capture device of FIG. 1, according to an exemplary embodiment.
Figure 3:
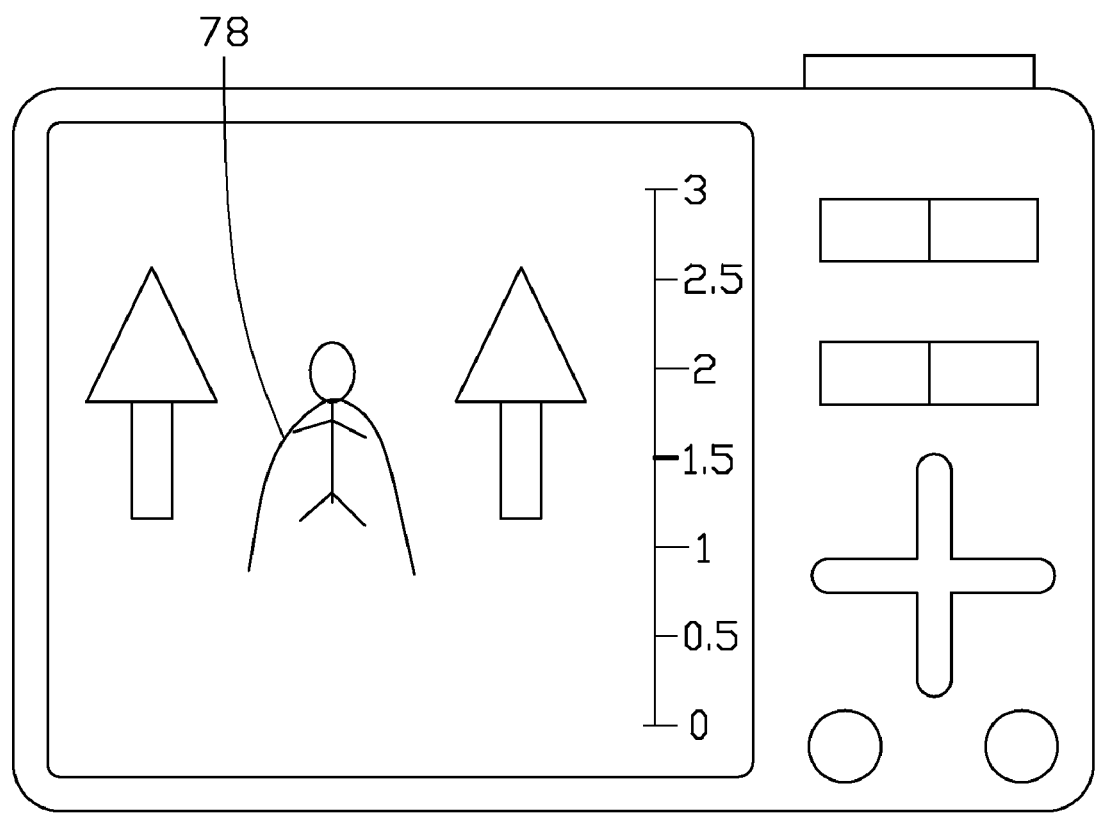
FIG. 3 is another schematic view of the back of the digital image capture device of FIG. 1, according to an exemplary embodiment.

The flash assist system 70 includes a read unit 72, a determination unit 74, and a generating unit 76. The read unit 72 is configured for reading the object distance and the flash distance from the camera module 10 and the input unit 40 correspondingly. The determination unit 74 is configured for determining a target area using the flash distance and the object distance, based upon parameters of the flash unit 20, such as an emission angle of flash from the flash unit 20. The generating unit 76 is configured for generating a preview of the object and the target area on the display 30. In the present embodiment, the generating unit 76 illustrates the target area via forming a help line 78 at the edge of the target area. If the flash distance exceeds the object distance, the help line 78 surrounds the object in the preview as shown in FIG. 2, such that the target area covers the whole object. If the flash distance is less than the object distance, the help line 78 may cross the object as shown in FIG. 3 such that the target area covers only a part of the object, indicating the need to increase the flash distance for sufficient illumination.

In this way, the digital image capture device 100 illustrates the target area that can be illuminated by the flash unit 20, thereby providing the necessary information for accurate manual setting of the flash intensity.

Figure 4:
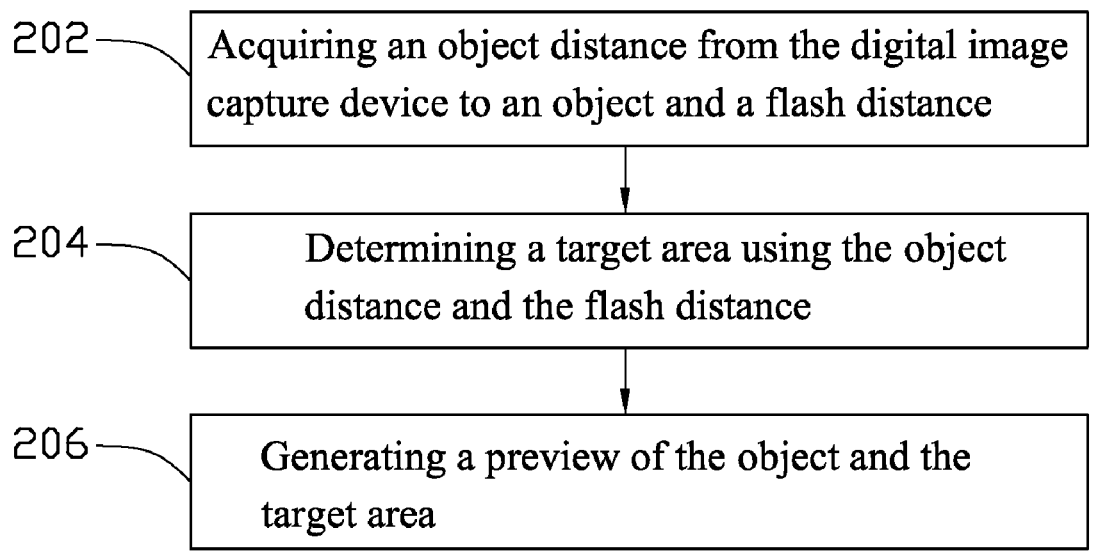
FIG. 4 is a flowchart of a flash assist method, according to an exemplary embodiment.

FIG. 4 shows a flash assist method as disclosed, which can be implemented by a digital image capture device such as that also disclosed here, as follows.

In Step 202, an object distance from the digital image capture device 100 to an object and a flash distance are acquired. Camera module 10 automatically focuses on an object, and calculates the distance from the image capture device to the object. The flash distance is input from the input unit 40. The read unit 72 of the flash assist system 70 reads the object distance and the flash distance.

In Step 204, a target area is determined using the object distance and the flash distance. The determination unit 74 determines a target area to be illuminated on the display 30 using the object distance and the flash distance. If the flash distance exceeds the object distance, the target area covers the whole object as shown in FIG. 2. If the flash distance is less than the object distance, the target area may cover only a part of the object as shown in FIG. 3, indicating the need to increase the flash distance for sufficient illumination.

In Step 206, a preview of the object and target areas is generated. The generating unit 76 generates a preview of the object and the target area on the display 30. The target area can be illustrated by a help line generated at the edge thereof.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A flash assist system for use in a digital image capture device, the digital image capture device comprising a camera module capable of determining a distance from the digital image capture device to an object, an input unit configured for receiving user inputs that determine a flash distance, a flash unit capable of providing varying flash intensity by setting the flash distance based upon the user inputs via the input unit, and a display capable of displaying digital images and interactive information, the flash assist system comprising:
   a read unit configured for reading the object distance and the flash distance;
   a determination unit configured for determining a target area of the flash unit using the object distance and the flash distance; and
   a generating unit configured for generating a preview of the object and the target area on the display;
   wherein the display and the input unit are integrated into a touch-screen, the touch-screen displays a numerical range of flash distance as a bar, the flash distance is manually selected by touching a location of the bar.

2. The flash assist system as claimed in claim 1, wherein the target area covers the whole object if the flash distance exceeds the object distance.

3. The flash assist system as claimed in claim 1, wherein the target area is illustrated by showing a help line at the edge thereof.

4. A digital image capture device comprising:
   a camera module capable of determining an object distance from the image capture device to an object;
   an input unit configured for receiving user inputs that determine a flash distance;
   a flash unit capable of providing varying flash intensity by setting the flash distance based upon the user inputs via the input unit;
   a display capable of displaying digital images and interactive information; and
   a flash assist system capable of reading the object distance and the flash distance, determining a target area of the flash unit using the object distance and the flash distance, and generating a preview of the object and the target area on the display;
   wherein the display and the input unit are integrated into a touch-screen, the touch-screen displays a numerical range of flash distance as a bar, the flash distance is manually selected by touching a location of the bar.

5. The digital image capture device as claimed in claim 4, wherein the camera module automatically focuses on the object, and is driven by a focus motor step by step until a clear image is generated, and the object distance is calculated according to the number of steps that the focus motor takes to acquire the clear image.

6. The digital image capture device as claimed in claim 4, wherein the camera module comprises a distance-measurement unit capable of emitting a light beam to the object, calculating the time before it receives the light reflected from the object, and calculating the object distance accordingly.

7. The digital image capture device as claimed in claim 4, wherein the target area covers the whole object if the flash distance exceeds the object distance.

8. The digital image capture device as claimed in claim 4, wherein the target area is illustrated by showing a help line at the edge thereof.

* * * * *